United States Patent [19]  [11] 4,182,156
Denk  [45] Jan. 8, 1980

[54] MEASURING DEVICE FOR MEASURING THE ANGLE OF ROTATION OF A MACHINE

[75] Inventor: Heimo Denk, Feldbach, Austria

[73] Assignee: Hans List, Graz, Austria

[21] Appl. No.: 895,811

[22] Filed: Apr. 12, 1978

[30] Foreign Application Priority Data

Apr. 13, 1977 [AT] Austria .................................. 2561/77

[51] Int. Cl.² .......................................... G01M 15/00
[52] U.S. Cl. .......................................... 73/35; 73/518
[58] Field of Search ................ 324/16 T, 181; 73/35, 73/118, 432 R; 123/146.5 A

[56] References Cited

U.S. PATENT DOCUMENTS

| 3,883,795 | 5/1975 | Klein et al. | 324/16 T X |
| 4,052,663 | 10/1977 | Lindsey | 324/16 T X |
| 4,095,179 | 6/1978 | Bremer et al. | 324/16 T X |

Primary Examiner—James J. Gill, Jr.
Attorney, Agent, or Firm—Lawrence R. Radanovic

[57] ABSTRACT

A measuring device for measuring the angle of rotation of a machine shaft between a reference angular position of the shaft and the angular position at the instant of the occurring of a phenomenon caused by the operation of the machine.

5 Claims, 2 Drawing Figures

MEASURING DEVICE FOR MEASURING THE ANGLE OF ROTATION OF A MACHINE

BACKGROUND OF THE INVENTION

1. Field of the Invention

The present invention relates to a measuring device for measuring the angle of rotation of a machine shaft between a reference angular position of the shaft and the angular position at the instant of the occurrence of a phenomenon caused by the operation of the machine. The device includes transducers which transmit a number of pulses when the shaft passes the reference angular position and the machine-typical phenomenon occurs, the pulses being feedable to a processing circuit which generates an angle proportional signal out of the time interval between the passing of the shaft at the reference angular position and the occurence of the machine-typical phenomenon whereby said transducer signals a feedable to a threshold value switch, preferably to a comparator.

2. Description of the Prior Art

The principle of such a measurement mentioned above is to produce a gate signal with a duration equal to the duration while the rotation of the shaft is to be measured. For the specification of the angle in degrees of angle it is necessary to transform the duration of the gate signal into degrees of angle. To produce the gate signal it is necessary that with the aid of transducers at the beginning and the end of the gate signal a pulse or an edge of the pulse is obtained at each cycle of rotation. If such an angle measurement takes place at an internal combustion engine, it may happen that the beginning and the end of the gate signal cannot be defined by a single transducer pulse but only by the first pulse of a group of pulses which is cyclically repeated. A known method to fade out pulses which follow the first one is to start a monostable sweep circuit with the first pulse, whereby the running time of the sweep circuit is larger than the duration of the emission of the group of pulses. If the amplitude of the first pulse is substantially higher than the following pulses of the group of pulses it is possible, as known from German Offenlegungshrift No. 2 246 252, to avoid a multiple triggering with a simple threshold value switch. But if some of the pulses of the group have equal amplitudes and the length of the periodical groups of pulses is not short in respect to the period, using the method disclosed by the above mentioned specification avoidance of multiple triggering operation in cases of a greater engine speed range is only possible if the running time of the monostable sweep circuit is changeable in accordance with the engine speed. At a broad speed range therefore repeated changing of the running time of the monostable sweep circuit may be necessary and thus the required resources have to be significantly higher.

SUMMARY OF THE INVENTION

It is an object of the invention to provide a measuring device of the kind mentioned above which enables operation in a great speed range without the need of interference at the circuit for fading out pulses following the first one of the group of pulses.

To obtain this according to the invention the outlet of the comparator is connected to a control device, preferably a transmission gate of a constant voltage integrator and, the control device resets and blocks or releases the integrator according to the switching condition of the threshold value switch and the outlet of the integrator is connected to a first inlet of a second comparator and a peak value storage, preferably built by an operational amplifier. The outlet of the peak value storage is connected to a voltage divider whereby the midpoint tap of the voltage divider is connected to the second inlet of the second comparator so that at the occurence of the machine-typical phenomenon a usable signal is available at the outlet of the second comparator.

This device ensures that the time difference between one of the edges of pulses, e.g. the ascending edges of pulses, appearing at the outlet of the second comparator corresponds to the time difference between the ascending edges of the first pulses emitted by the transducers. The speed range within which the device according to the invention may be used is limited to low values by the discharge time coefficient of the peak value storage. The time coefficient has to be great enough to avoid a decrease of the voltage at the midpoint tap of the voltage divider connected to the outlet of the peak value storage below the charging voltage of the integrator during the last pulse of a group of pulses, whereby also the switching value of the comparator has to be considered. However, the realization of adequate discharge time coefficients is very simple and therefore the invention may be used also for measurements at slow speed rotational members. The maximum speed at which the device may be used is essentially defined by the voltage reduction which is preferably about 20%, caused by the voltage divider and by the charging time coefficient of the integrator. The sweepable speed range is therefore limited in the main by the time coefficients of two independent timing circuits. The device may therefore be designed for a remarkably greater speed range than was possible for devices known hitherto at which the speed range was determined by the design of one single timing circuit of the monostable multi-vibrator.

According to a preferred embodiment of the invention the outlets of the threshold value switch and the comparator fed by the integrator and the voltage divider are connected to the inlets of a logic circuit comprising a NOR and an AND-gate and, if necessary, an interposed inverter. By this measure time shift between the first edge of the outlet of the threshold value switch and the first edge of the outlet of the comparator due to the non-infinite slew rate of the comparator can be eliminated, and a synchronization of the edges of the outlet signal which define the gate signal time, with the first edges of the first pulses of the pulse group can be attained, if the extremely slight time-lag of the threshold value switch and the logic circuit is neglected.

DESCRIPTION OF THE DRAWINGS

The invention will be hereinafter more specifically described with reference to a preferred embodiment depicted in the accompanying drawings, wherein.

DESCRIPTION OF THE PREFERRED EMBODIMENT

Figure 1:
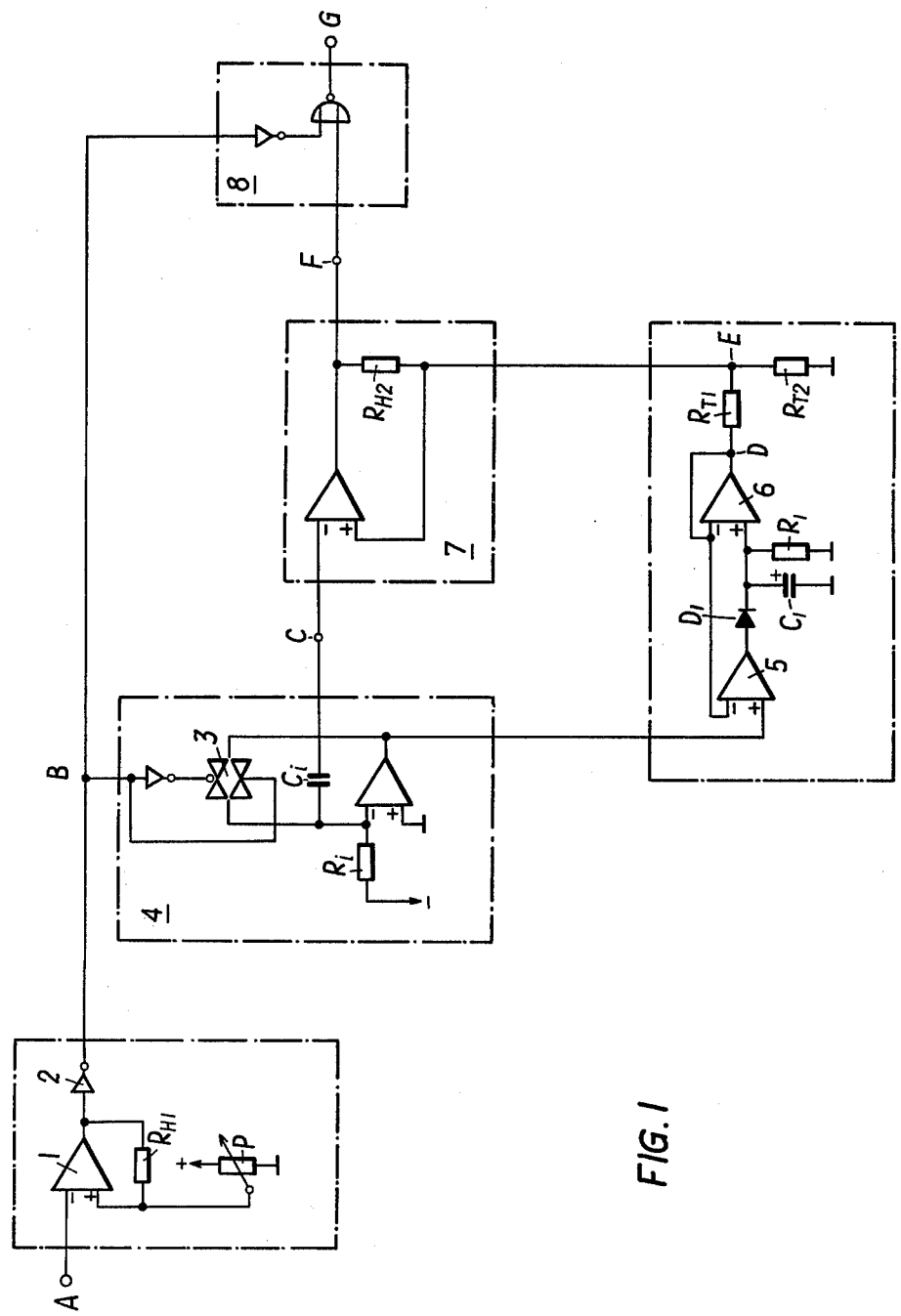
FIG. 1 shows the circuit arrangement.

The amplified transducer signal is fed to a comparator 1 serving as a threshold valve switch, the threshold level of which being adjustable by the potentiometer P and its hysteresis being defined by the resistor $R_{H1}$.

The outlet signal B of the inverter 2 subsequently added to the comparator 1, is fed to the control circuit of the integrator 4 which comprises a transmission gate 3. In the case of a positive control voltage the control circuit shunts the capacitor $C_i$ of the integrator 4 holding the capacitor $C_i$ at zero level.

If a negative control voltage is fed to the transmission gate 3, the integrator outlet voltage C ascends linearly according to the slew rate defined by the time coefficient $R_i.C_i$, 4,3. The peak value obtained at the respective period is stored at the peak value storage, built by the two operational amplifiers 5 and 6 whereby the discharge time of the storage-capacitor $C_1$ is defined by the resistor $R_1$. A voltage divider consisting of the resistors $R_{T1}$ and $R_{T2}$ is subsequently added to the peak value storage. The midpoint tap E of the voltage divider and the outlet C of the integrator are connected to a comparator 7. If the integrator output voltage C which is fed to the inverting inlet of comparator 7 becomes more positive than the voltage peak value E determined by the peak value gauge in the prior period and which already had decreased a little due to the time coefficient $C_1.R_1$, the comparator outlet F becomes negative. As soon as at the next positive edge of the comparator outlet B the comparator resets the integrator to zero level the voltage at the outlet C of the integrator, respectively at the inverting inlet of the comparator falls short of the divided voltage peak value E or the voltage at the non-inverting inlet of said comparator respectively, and its outlet voltage becomes positive again.

Figure 2:
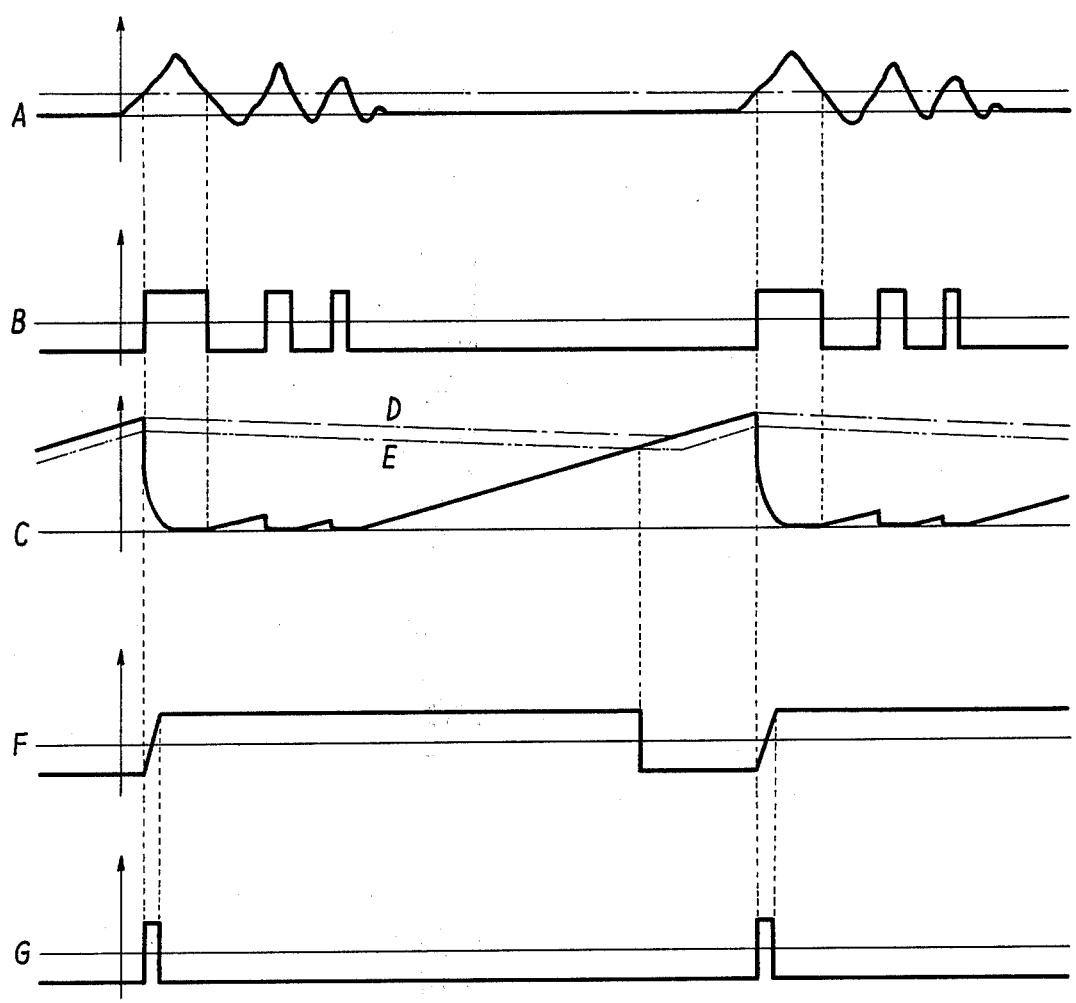
FIG. 2 shows the voltage run at different points of the circuit according to FIG. 1.

For the compensation of the time shift between the first positive edge appearing at the outlet B of the threshold value switch and the first positive edge at the outlet F of the comparator caused by the non-infinite slew rate of the comparator 7, the two outlets B and F are connected to a logic circuit 8, comprising an inverter and a NOR-gate. As, especially shown by FIG. 2, the signal at the outlet F of the comparator 7 before the arrival of the first pulse of a group of pulses at the inlet A of the threshold value switch is negative. Before the arrival of the first pulse of a group of pulses the outlet of the threshold value switch is negative; however, a positive signal is fed to the inlet of the NOR-gate, due to the inverter. Therefore at the outlet of the NOR-gate before the arrival of the first pulse a negative signal is available. At the time the first pulse arrives at the inlet A the outlet of the threshold value switch becomes positive and therefore the corresponding inlet of the NOR-gate becomes negative, causing the outlet G of the gate to become and remain positive as long as the outlet of the comparator 7 is negative due to the finite slew rate of the comparator, although already a positive pulse is present at the outlet of the threshold value switch.

In principle it is possible to build up the circuit according the invention with other elements than that shown in FIG. 1. For instance the threshold value switch may be built as a Schmitt-Trigger and the peak value storage may be built by a simple capacitor. Further it is possible to eliminate the inverter 2 as well as the inverter of the logic circuit. It is only essential that the threshold value switch be connected to an integrator 4 which according to its control may be released, reset or blocked respectively, and if necessary, to a logic circuit 8 comprising a NOR- or an AND-gate whereby the integrator is connected directly and via a peak value storage and a voltage divider subsequently added to the peak value storage to a comparator which, if desired, may be connected to the logic circuit.

I claim:

1. A device for producing a gate signal with a duration equal to the duration of the rotation of a shaft of a machine between a reference angular position of said shaft and its angular position at the instant of an occurrence of a phenomenon caused by the operation of said machine, said gate signal being usable in combination with further signals to measure the angle of rotation of said shaft between said reference angular position of said shaft and its angular position at the instant of the machine-typical phenomenon, said device comprising transducers which transmit a number of pulses when said shaft passes the reference angular position and the machine-typical phenomenon occurs, said pulses being transmittable to a processing circuit which generates an angle proportional signal out of the time interval between the passing of said shaft at the reference angular position and the occurrence of the machine-typical phenomenon whereby said transducer signals are transmittable to a threshold value switch, wherein the outlet of said threshold value switch is connected to a control device of a constant-voltage integrator and said control device resets and blocks or releases said integrator according to the switching condition of the threshold value switch, and wherein the outlet of said integrator is connected to a first inlet of a second comparator and a peak value storage, the outlet of said peak value storage being connected to a voltage divider whereby the midpoint tap of said voltage divider is connected to the second inlet of said second comparator so that at the occurrence of the machine-typical phenomenon a usable signal is available at the outlet of said second comparator.

2. The device according to claim 1, wherein said threshold value switch comprises a comparator.

3. The device according to claim 1, wherein said control device of said constant-voltage integrator is defined by a transmission gate.

4. The device according to claim 1, wherein the peak value storage is defined by an operational amplifier.

5. The device according to claim 1, wherein the outlets of said threshold value switch and said second comparator transmitted by said integrator and said voltage divider are connected to the inlets of a logic circuit comprising a NOR- or an AND- gate and, if necessary, an interposed inverter.

* * * * *